(12) United States Patent
Zheng

(10) Patent No.: US 9,677,657 B2
(45) Date of Patent: Jun. 13, 2017

(54) CIRCULAR WAVE DRIVE

(71) Applicant: OHIO STATE INNOVATION FOUNDATION, Columbus, OH (US)

(72) Inventor: Yuan F. Zheng, Columbus, OH (US)

(73) Assignee: Spectrum Diversified Designs, LLC, Streetsboro, OH (US)

( * ) Notice: Subject to any disclaimer, the term of this patent is extended or adjusted under 35 U.S.C. 154(b) by 0 days.

(21) Appl. No.: 14/291,960

(22) Filed: May 30, 2014

(65) Prior Publication Data

US 2015/0345607 A1 Dec. 3, 2015

(51) Int. Cl.
F16H 1/32 (2006.01)
F16H 49/00 (2006.01)

(52) U.S. Cl.
CPC ..... *F16H 49/001* (2013.01); *F16H 2049/003* (2013.01)

(58) Field of Classification Search
CPC .................... F16H 49/001; F16H 2049/003
USPC ........................................ 475/165, 163, 169
See application file for complete search history.

(56) References Cited

U.S. PATENT DOCUMENTS

| | | | |
|---|---|---|---|
| 3,196,713 A * | 7/1965 | Robinson ........................ | 74/640 |
| 5,145,468 A | 9/1992 | Nagabhusan | |
| 5,820,504 A | 10/1998 | Geralde | |
| 6,736,028 B2 | 5/2004 | Ruttor et al. | |
| 7,673,598 B2 | 3/2010 | Schaefer et al. | |
| 2006/0283289 A1* | 12/2006 | Baudendistel et al. ......... | 74/640 |
| 2012/0204674 A1* | 8/2012 | Lundberg et al. ............... | 74/640 |
| 2013/0049508 A1* | 2/2013 | Willems ........................ | 310/105 |

FOREIGN PATENT DOCUMENTS

| | | |
|---|---|---|
| CN | 99111768 A | 2/2001 |
| JP | 2011241974 A | 12/2011 |

OTHER PUBLICATIONS

Chen, Chao et al., Kinematic and Geometric Analysis of a Pure-Rolling Epicyclic Train, Journal of Mechanical Design, Aug. 2007, pp. 852-857, vol. 129, Issue 8.
Gorla, Carol et al., Theoretical and Experimental Analysis of a Cycloidal Speed Reducer, Journal of Mechanical Design, Nov. 2008, pp. 112604-1-112604-8, vol. 130, Issue 11.
Blagojevic, Mirko et al., A New Design of a Two-Stage Cycloidal Speed Reducer, Journal of Mechanical Design, Aug. 2011, pp. 085001-1-0805001-7, vol. 133, Issue 8.
English abstract of JP20112411974A [online] [retrieved on Oct. 26, 2015]. Retrieved from the European Patent Office website using Internet <URL: http://worldwide.espacenet.com/>.

(Continued)

*Primary Examiner* — David J Hlavka
(74) *Attorney, Agent, or Firm* — Benesch, Friedlander, Coplan & Aronoff LLP

(57) ABSTRACT

Exemplary embodiments of the invention are directed to drive mechanisms that may be used in, for example, power transmission and/or speed reduction applications. Exemplary embodiments of the invention may include a housing within which is located a wheel. A portion of a wave generator and a portion of an output element also reside within the chamber and are in communication with the wheel. Rotation of the wave generator causes a rotation of the wheel in a slipping manner and, thus, with a reduced rotational speed. Rotation of the wheel causes a rotation of the output element.

20 Claims, 6 Drawing Sheets

(56) References Cited

OTHER PUBLICATIONS

International Search Report and Written Opinion of related application PCT/US15/33421, mailed Aug. 21, 2015.
Harmonic Drive® SHD-2UH-LW Ultra-Flat, Lightweight, Hollow Shaft Gear Unit Brochure [online][retrieved on Oct. 26, 2015], last revised Apr. 1, 2015. Retrieved from Harmonic Drive LLC website using Internet <URL: http://harmonicdrive.net/media/support/catalogs/pdf/shd-2uh-lw-brochure.pdf>; [retrieved on Jul. 31, 2013], last revised Mar. 2013. Retrieved from Wayback Machine website using Internet <URL: https://web.archive.org/web/20130731220515/http://harmonicdrive.net/media/support/catalogs/pdf/shd-2uh-lw-brochure.pdf>.
Harmonic Drive® HPF Hollow Shaft Harmonic Planetary® Gear Product Description [online][retrieved on Oct. 26, 2015], publication date unknown. Retrieved from Harmonic Drive LLC website using Internet <URL: http://www.harmonicdrivegearhead.com/products/harmonic-planetary-gear-units/hpf>.
Harmonic Drive® HDI Series Infinit-Indexer® Phase Adjuster Product Description [online][retrieved on Oct. 26, 2015], publication date unknown. Retrieved from Harmonic Drive LLC website using Internet <URL: http://harmonicdrive.net/products/gearheads/hdi/>; [retrieved on Apr. 21, 2006], publication date unknown. Retrieved from Wayback Machine website using Internet <URL: https://web.archive.org/web/20060421012912/http://www.harmonicdrive.net/products/gearheads/hdi/>.
Harmonic Drive® Infinit-Indexer® Built-to-Order Product Catalog [online][retrieved on Oct. 26, 2015], publication date unknown. Retrieved from Harmonic Drive LLC website using Internet <URL: http://harmonicdrive.net/media/support/catalogs/pdf/hdi-infinit-indexer.pdf>; [retrieved on Apr. 6, 2006], publication date unknown. Retrieved from Wayback Machine website using Internet <URL: https://web.archive.org/web/20060406135506/http://www.harmonicdrive.net/media/support/catalogs/pdf/infinit_indexer.pdf>.
Cycloidal Drive from Wikipedia, the free encyclopedia [online] [retrieved on Oct. 26, 2015], publication date unknown. Retrieved from Wikipedia website using Internet <URL: https://en.wikipedia.org/wiki/Cycloidal_drive>; [retrieved on Feb. 4, 2010], last modified on Dec. 10, 2009, publication date unknown. Retrieved from Wayback Machine website using Internet <URL: https://web.archive.org/web/20100204184740/http://en.wikipedia.org/wiki/Cycloidal_drive>.
Harmonic Drive from Wikipedia, the free encyclopedia [online] [retrieved on Oct. 26, 2015], publication date unknown. Retrieved from Wikipedia website using Internet <URL: https://en.wikipedia.org/wiki/Harmonic_drive>; [retrieved May 17, 2008], last modified on May 14, 2008, publication date unknown. Retrieved from Wayback Machine website using Internet <URL: https://web.archive.org/web/20080517062459/http://en.wikipedia.org/wiki/Harmonic_drive>.
Cycloidal Drive description from Mathworks® [online][retrieved on Oct. 26, 2015], publication date unknown. Retrieved from Mathworks® website using Internet <URL: http://www.mathworks.com/help/physmod/sdl/ref/cycloidaldrive.html>; [Retrieved on Nov. 1, 2014], publication date unknown. Retrieved from Wayback Machine website using Internet <URL: https://web.archive.org/web/20141101140021/http://www.mathworks.com/help/physmod/sdl/ref/cycloidaldrive.html>.
Harmonic Drive® gear product descriptions [online][retrieved on Oct. 26, 2015], publication date unknown. Retrieved from Harmonic Drive LLC website using Internet <URL: http://harmonicdrive.net/products/gearheads/>; [retrieved on Apr. 6, 2006], publication date unknown. Retrieved from Wayback Machine website using Internet <URL: https://web.archive.org/web/20060406134909/http://www.harmonicdrive.net/products/gearheads/>.
Harmonic Drive® Ultra Flat CSD Series Product Description [online][retrived on Oct. 26, 2015], publication date unknown. Retrieved from Harmonic Drive LLC website using Internet <URL: http://harmonicdrive.net/products/gearheads/csd-gearheads/>; [retrieved on Jul. 3, 2010], publication date unknown. Retrieved from Wayback Machine website using Internet <URL: https://web.archive.org/web/20100703052534/http://www.harmonicdrive.net/products/gearheads/csd-gearheads/>.
Harmonic Drive® Ultra Flat SHD Series Product Description [online][retrived on Oct. 26, 2015], publication date unknown. Retrieved from Harmonic Drive LLC website using Internet <URL: http://harmonicdrive.net/products/gearheads/csd-gearheads/>; [retrieved on Apr. 6, 2006], publication date unknown. Retrieved from Wayback Machine website using Internet <URL: https://web.archive.org/web/20060406134915/http://www.harmonicdrive.net/products/gearheads/shd-gearheads/>.
Harmonic Drive® CSD & SHD Series Product Catalog [online][retrieved on Oct. 26, 2015], last revised Jul. 2014. Retrieved from Harmonic Drive LLC website using Internet <URL: http://harmonicdrive.net/media/support/catalogs/pdf/csd-shd-catalog.pdf>; [retrieved on Apr. 6, 2006], last revised Mar. 2006. Retrieved from Wayback Machine website using Internet <URL: https://web.archive.org/web/20060406134915/http://www.harmonicdrive.net/media/support/catalogs/pdf/csd-shd-pdf>.
Harmonic Drive® CSG High Torque Gearhead Product Description [online][retrieved on Oct. 26, 2015], publication date unknown. Retrieved from Harmonic Drive LLC website using Internet <URL: http://harmonicdrive.net/products/gearheads/csg-unit/>; [retrieved on Apr. 22, 2013], publication date unknown. Retrieved from Wayback Machine website using Internet <URL: https://web.archive.org/web/20130422103235/http://www.harmonicdrive.net/products/gearheads/csg-unit>.
Harmonic Drive® CSF & CSG Series Product Catalog [online][retrieved on Oct. 26, 2015], last revised Jun. 2, 2015. Retrieved from Harmonic Drive LLC website using Internet <URL: http://harmonicdrive.net/media/support/catalogs/pdf/csf-csg-catalog.pdf>; [retrieved on Apr. 21, 2006], last revised Mar. 2006. Retrieved from Wayback Machine website using Internet <URL: https://web.archive.org/web/20060406135246/http://www.harmonicdrive.net/media/support/catalogs/pdf/csf-csg.pdf>.
Harmonic Drive® CSG-LW Brochure [online][retrieved on Oct. 26, 2015], last revised Jun. 2014. Retrieved from Harmonic Drive LLC website using Internet <URL: http://harmonicdrive.net/media/support/catalogs/pdf/csg-lw-brochure.pdf>; [retrieved on Apr. 22, 2013], last revised Jan. 2013. Retrieved from Wayback Machine website using Internet <URL: https://web.archive.org/web/20130422103235/http://www.harmonicdrive.net/media/support/catalogs/pdf/csg-lw-brochure.pdf>.
Harmonic Drive® CSG 2UK High Torque Gear Unit Product Description [online][retrieved on Oct. 26, 2015], publication date unknown. Retrieved from Harmonic Drive LLC website using Internet <URL: http://harmonicdrive.net/products/gearheads/csg-2uk/>.
Harmonic Drive® New Product News vol. 19 Harmonic Drive® CSG Series Fully Enclosed, Sealed Housing, CSG-2UK Catalog, last revision [Aug. 6, 2015]. Retrieved from Harmonic Drive LLC website using Internet <URL: http://harmonicdrive.net/media/support/catalogs/pdf/csg-2uk.pdf>.
Harmonic Drive® CSF Gearhead Product Description [online][retrieved on Oct. 26, 2015], publication date unknown. Retrieved from Harmonic Drive LLC website using Internet <URL: http://harmonicdrive.net/products/gearheads/csf-unit/>; [retrieved on Oct. 2, 2013], publication date unknown. Retrieved from Wayback Machine website using Internet <URL: hhttps://web.archive.org/web/20131002235559/http://harmonicdrive.net/products/gearheads/csf-unit/>.
Harmonic Drive® CSF-LW Brochure [online][retrieved on Oct. 26, 2015], last revised Jun. 2014. Retrieved from Harmonic Drive LLC website using Internet <URL: http://harmonicdrive.net/media/support/catalogs/pdf/csf-lw-brochure.pdf>; [retrieved on Oct. 2, 2013], last revised Jan. 2013. Retrieved from Wayback Machine website using Internet <URL: https://web.archive.org/web/20131002235559/http://harmonicdrive.net/nnedia/support/catalogs/pdf/csf-lw-brochure.pdf>.
Harmonic Drive® CSF-2UP Mini Gear Unit Product Description [online][retrieved on Oct. 26, 2015], publication date unknown.

(56) References Cited

OTHER PUBLICATIONS

Retrieved from Harmonic Drive LLC website using Internet <URL: http://harmonicdrive.net/products/gearheads/csf-2up/>.
Harmonic Drive® New Product News vol. 22 Harmonic Drive® the CSF-mini series now includes Ultra Flat models with High-Moment Stiffness [Jul. 8, 2015][online][retrieved on Oct. 26, 2015]. Retrieved from Harmonic Drive LLC website using Internet <URL: http://harmonicdrive.net/media/support/catalogs/pdf/CSF-2UP-Brochure.pdf>.
Harmonic Drive® CSF Series Mini Gearheads Product Description [online][retrieved on Oct. 26, 2015], publication date unknown. Retrieved from Harmonic Drive LLC website using Internet <URL: http://harmonicdrive.net/products/gearheads/csf-mini/>; [retrieved on Jul. 18, 2006], publication date unknown. Retrieved from Wayback Machine website using Internet <URL: https://web.archive.org/web/20060718015844/http://www.harmonicdrive.net/products/gearheads/csf-mini/>.
For Precision Control Harmonic Driven™ Speed Reducer CSF-3 Series Manual [online][retrieved on Oct. 26, 2015], last revised Aug. 2011. Retrieved from Harmonic Drive LLC website using Internet <URL: http://harmonicdrive.net/media/support/catalogs/pdf/csf-miniature-gearhead-size-3.pdf>.
Harmonic Drive® Miniature Gearheads Product Catalog [online][retrieved on Oct. 26, 2015], last revised Jul. 2014. Retrieved from Harmonic Drive LLC website using Internet <URL: http://harmonicdrive.net/media/support/catalogs/pdf/csf-mini-5-14.pdf>; [retrieved on Jul. 18, 2006], last revised Mar. 2006. Retrieved from Wayback Machine website using Internet <URL: https://web.archive.org/web/20060718015844/http://www.harmonicdrive.net/media/support/catalogs/pdf/csf_mini.pdf>.
Harmonic Drive® CSF-GH Product Description [online][retrieved on Oct. 26, 2015], publication date unknown. Retrieved from Harmonic Drive LLC website using Internet <URL: http://www.harmonicdrivegearhead.com/products/harmonic-drive/csf-gh>.
Harmonic Drive® CSF-GH & CSG-GH Harmonic Gear Principle [online][retrieved on Oct. 26, 2015], publication date unknown. Retrieved from Harmonic Drive LLC website using Internet <URL: http://www.harmonicdrivegearhead.com/technology/harmonic-drive>.
Harmonic Drive® CSG-GH Product Description [online][retrieved on Oct. 26, 2015], publication date unknown. Retrieved from Harmonic Drive LLC website using Internet <URL: http://www.harmonicdrivegearhead.com/products/harmonic-drive/csg-gh>.
Harmonic Drive® HPG Standard Series Product Description [online][retrieved on Oct. 26, 2015], publication date unknown. Retrieved from Harmonic Drive LLC website using Internet <URL: http://www.harmonicdrivegearhead.com/products/harmonic-planetary/hpg>.
HPG, HPGP & HPF Series HarmonicPlanetary® Coninous Backlash Compensation [online][retrieved on Oct. 26, 2015], publication date unknown. Retrieved from Harmonic Drive LLC website using Internet <URL: http://www.harmonicdrivegearhead.com/technology/harmonic-planetary/hpg-hpgp>.
Harmonic Drive® HPG Right Angle Harmonic Planetary® Product Description [online][retrieved on Oct. 26, 2015], publication date unknown. Retrieved from Harmonic Drive LLC website using Internet <URL: http://www.harmonicdrivegearhead.com/products/harmonic-planetary/hpg-right-angle>.
Harmonic Drive® HPGP High Torque Harmonic Planetary® Gearhead Product Description [online][retrieved on Oct. 26, 2015], publication date unknown. Retrieved from Harmonic Drive LLC website using Internet <URL: http://www.harmonicdrivegearhead.com/products/harmonic-planetary/hpgp>.
Harmonic Drive® HPN Value Series Harmonic Planetary® Gearhead Product Description [online][retrieved on Oct. 26, 2015], publication date unknown. Retrieved from Harmonic Drive LLC website using Internet <URL: http://www.harmonicdrivegearhead.com/products/harmonic-planetary/hpn>.
HPN Series HarmonicPlanetary® Description [online][retrieved on Oct. 26, 2015], publication date unknown. Retrieved from Harmonic Drive LLC website using Internet <URL: http://www.harmonicdrivegearhead.com/technology/harmonic-planetary/hpn>.
Harmonic Drive® SHG High Torque Gearhead Product Description [online][retrieved on Oct. 26, 2015], publication date unknown. Retrieved from Harmonic Drive LLC website using Internet <URL: http://harmonicdrive.net/products/.gearheads/shg-gearheads/>; [retrieved on Oct. 2, 2013], publication date unknown. Retrieved from Wayback Machine website using Internet <URL: https://web.archive.org/web/20131002222255/http://harmonicdrive.net/products/ gearheads/shg-gearheads/>.
Harmonic Drive® SHF and SHG Component Sets Housed Units Catalog [online][retrieved on Oct. 26, 2015], last revised Apr. 2015. Retrieved from Harmonic Drive LLC website using Internet <URL: http://harmonicdrive.net/media/support/catalogs/pdf/shf-shg-catalog.pdf>; [retrieved on May 6, 2006], last revised Mar. 2006. Retrieved from Wayback Machine website using Internet <URL: https://web.archive.org/web/20060506054932/http://www.harmonicdrive.net/ media/support/catalogs/pdf/shf-shg.pdf>.
Harmonic Drive® SHG/SHF-LW-13 Lightweight Hollow Shaft Gear Unit Brochure [online][retrieved on Oct. 26, 2015], last revised Jun. 2014. Retrieved from Harmonic Drive LLC website using Internet <URL: http://harmonicdrive.net/media/support/catalogs/pdf/shgshf-2uh-lw-brochure.pdf>; [retrieved on Oct. 2, 2013], last revised Mar. 2013. Retrieved from Wayback Machine website using Internet <URL: https://web.archive.org/web/20140327141327/http://harmonicdrive.net/media/support/catalogs/pdf/shgshf-2uh-lw-brochure.pdf>.
Harmonic Drive® SHF Gearhead Product Description [online][retrieved on Oct. 26, 2015], publication date unknown Retrieved from Harmonic Drive LLC website using Internet <URL: http://harmonicdrive.net/products/gearheads/shf-unit/>; [retrieved on Oct. 2, 2013], publication date unknown. Retrieved from Wayback Machine website using Internet <URL: https://web.archive.org/web/20131002214022/http://harmonicdrive.net/products/gearheads/shf-unit/>.
Harmonic Drive® SHD Ultra-flat Lightweight Hollow Shaft Gear Units Product Description [online][retrieved on Oct. 26, 2015], publication date unknown. Retrieved from Harmonic Drive LLC website using Internet <URL: http://harmonicdrive.net/products/gearheads/shd-2uh-lw/>; [retrieved on Jul. 31, 2013], publication date unknown. Retrieved from Wayback Machine website using Internet <URL: https://web.archive.org/web/20130731220515/http://harmonicdrive.net/products/gearheads/shd-2uh-lw>.

* cited by examiner

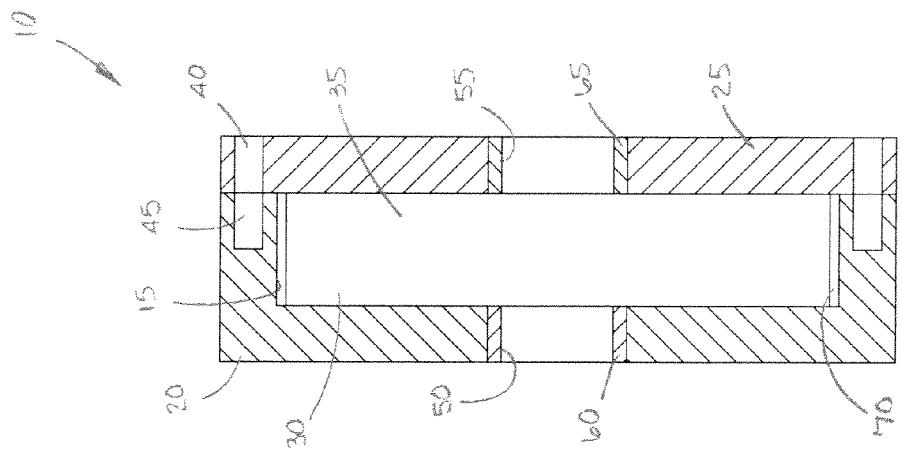
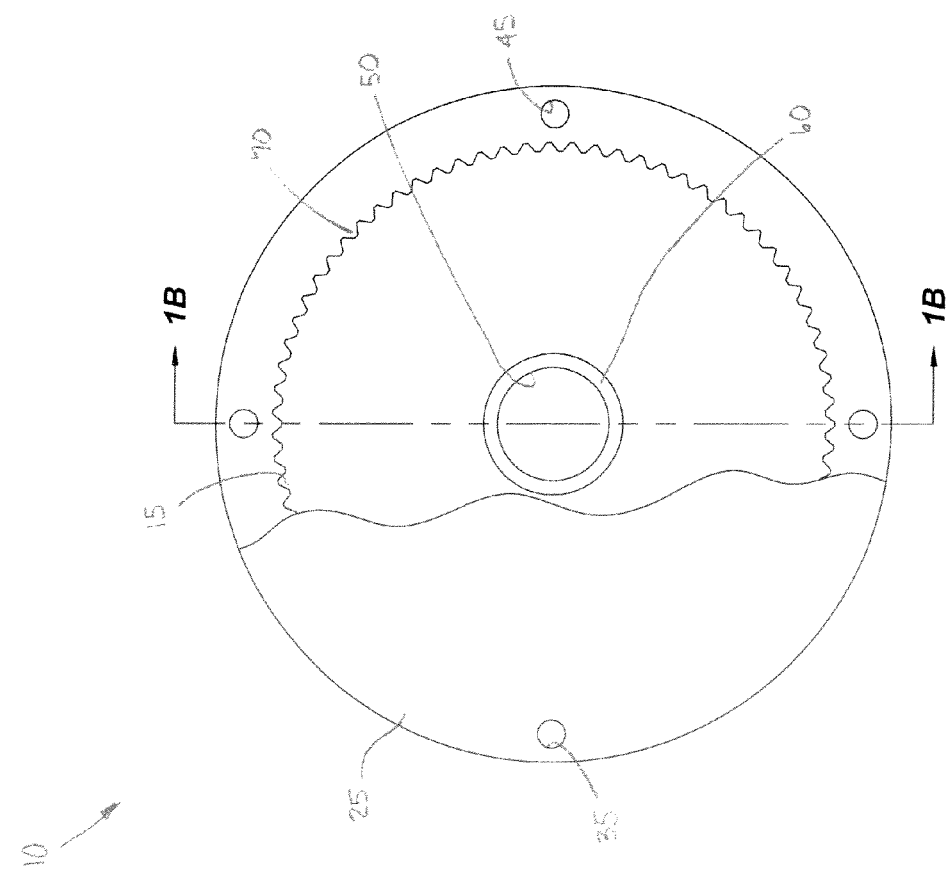

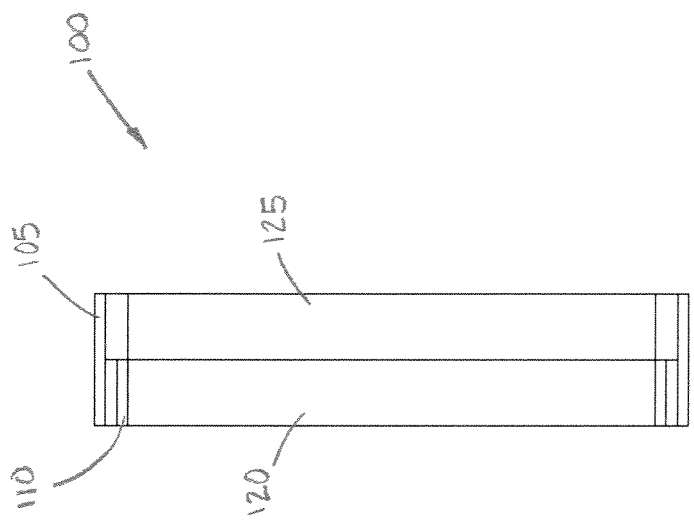
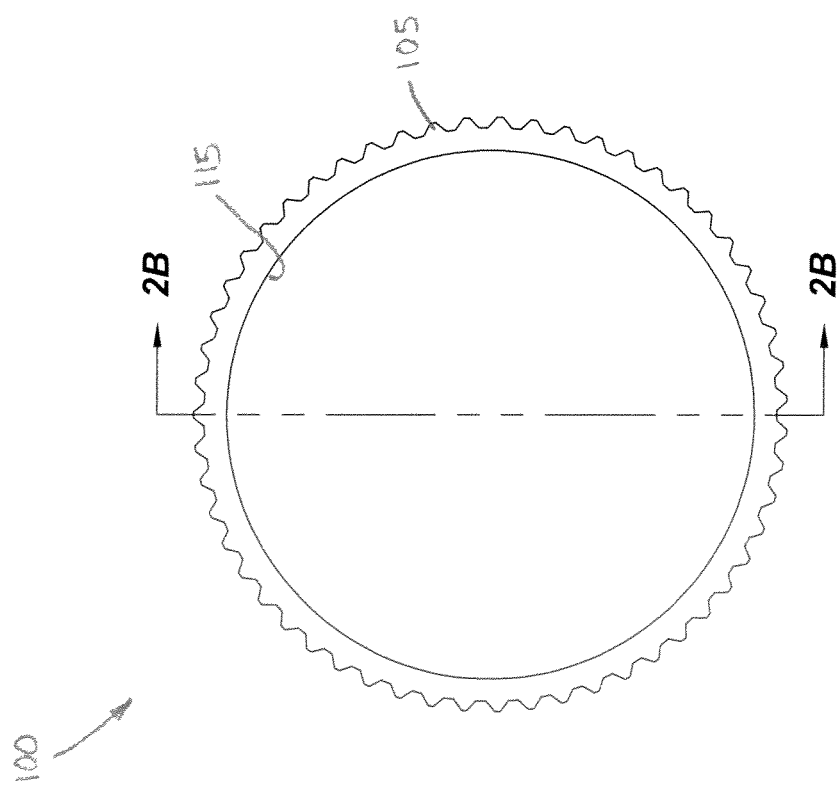
FIG. 2B
FIG. 2A

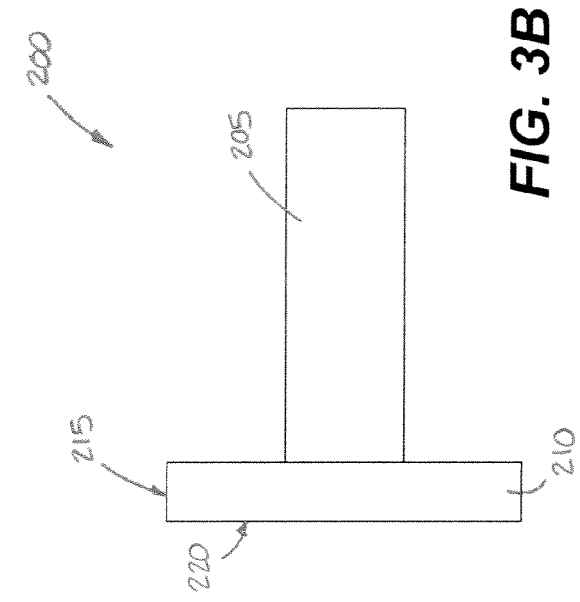
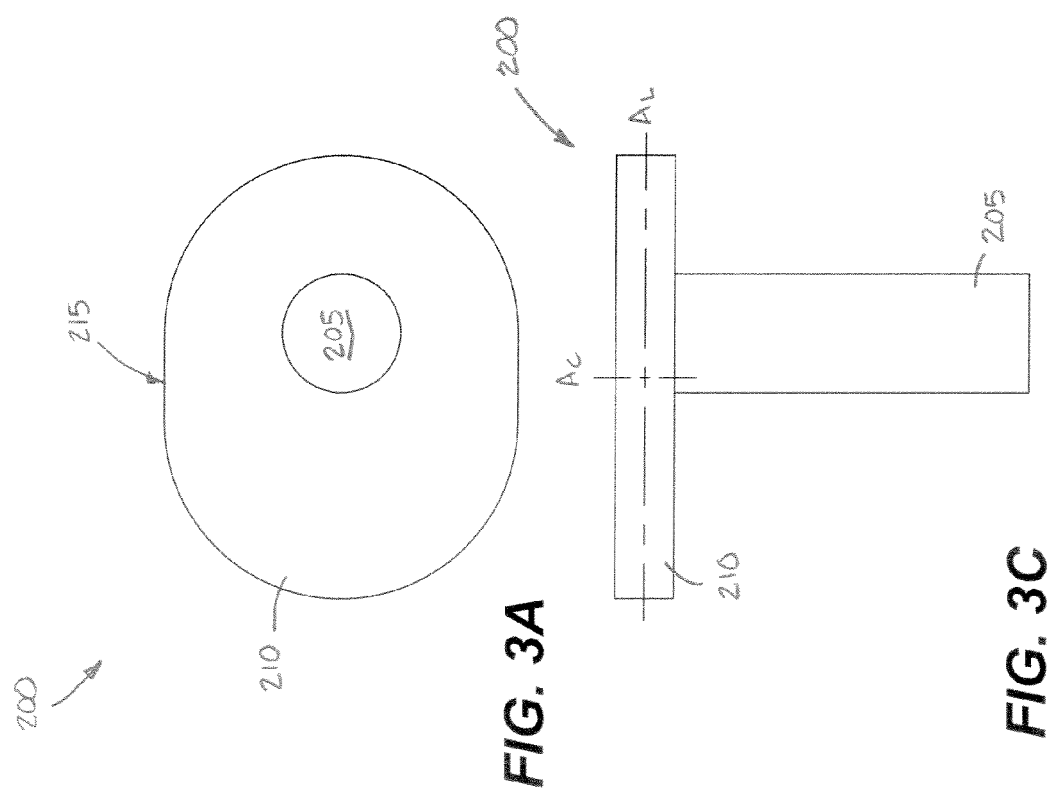
FIG. 3A
FIG. 3B
FIG. 3C

CIRCULAR WAVE DRIVE

TECHNICAL FIELD

Exemplary embodiments of the invention are directed to drive mechanisms that may be used in, for example, power transmission and/or speed reduction applications.

BACKGROUND

A number of devices for transmitting power and reducing motor output speed are currently known. Two such devices are the harmonic drive and the cycloidal drive.

The more well-known of these devices is no doubt the harmonic drive, having been introduced in the 1950's and currently being in wide-spread use. Harmonic drives offer a number of desirable operating characteristics, such as a high speed reduction ratio and high positional and rotational accuracy. However, harmonic drives also have several undesirable properties. First, harmonic drives require the use of flexible materials—particularly the material used to construct the flexspine. More particularly, harmonic drives use an elliptical wave generator that is forced into a toothed flexspine that rotates within a correspondingly toothed circular spine. The flexspine must be flexible so as to be deliberately deformed by and take on the shape of the elliptical wave generator. A special steel or another specialized deformable flexspine material is typically used for this reason. Additionally, the flexspine is subjected to continual elastic deformation during rotation of the wave generator. This deformation of the flexspine fatigues the material from which the flexspine is constructed, which fatigue limits the speed reduction and torque transfer that may be achieved with a harmonic drive.

Typical versions of the aforementioned cycloidal drive are of relatively complex construction and operation. Generally speaking, a cycloidal disc is provided for rotation within a chassis. A plurality of ring pins are associated with the chassis and distributed substantially equidistantly along a circular path for engagement by the cycloidal disc. An output shaft is also provided, and includes a number of output rollers that extend toward the cycloidal disc for engagement by receiving holes located therein. The cycloidal disc is eccentrically rotated by an input shaft mounted to an eccentric bearing. Rotation of the cycloidal disc causes the receiving holes therein to engage the output rollers of the output shaft. Because the output rollers are caused to travel about the periphery of the receiving holes in the cycloidal disc while the output shaft is rotated by the cycloidal disc, the rotational speed of the output shaft is reduced in comparison to the rotational speed of the cycloidal disc.

In addition to being of complex design, cycloidal drives are also typically not backdrivable. The eccentric rotation of the cycloidal disc also produces a vibration that may be transmitted through the input and output shafts if not compensated for. Contact between the output rollers and the receiving holes in the cycloidal disc may also lead to the wear of both components.

It can be understood from the foregoing commentary that there is a need for a power transmission/speed reduction device that does not suffer from the described drawbacks of known harmonic and cycloidal drives. Preferably, such a device will also be of more simplistic construction and of long life. Exemplary circular wave drive embodiments of the invention satisfy this need.

SUMMARY

Exemplary circular wave drive embodiments according to the invention are of simpler construction than known harmonic and cycloidal drives. Exemplary circular wave drive embodiments according to the invention are also compact in size, offer large speed reduction ratios, and operate with little to no backlash.

Generally speaking, exemplary circular wave drive embodiments according to the invention include a housing having a circular chamber therein. The housing may include a cover that closes a cavity in the housing so as to form the enclosed circular chamber. Teeth are disposed along an inside circular wall of the chamber. A ring-shaped wheel with a hollow central portion resides within the chamber. The wheel includes external teeth that mesh with the teeth located along the circular inner wall of the housing. The wheel diameter is smaller than the chamber diameter, such that only a portion of the wheel teeth are meshed with the internal housing teeth at any given time. The wheel also includes teeth that are disposed along a portion of the inner wall thereof.

Exemplary circular wave drive embodiments according to the invention also include a wave generator. The wave generator will typically have an input shaft portion and a wheel-driving portion. The wheel-driving portion of the wave generator may be oval-shaped or of truncated circle shape in cross-section, and the input shaft portion is offset from the central axis of the wheel-driving portion so as to impart an eccentric motion thereto when rotated. The long axis of the wheel-driving portion of the wave generator is of smaller dimension than the inner diameter of the wheel. The wheel-driving portion of the wave generator resides within the housing chamber and is located within the hollow central portion of the wheel, such that its peripheral surface is aligned with and is in partial contact with a non-toothed section of the wheel inner wall. The input shaft portion of the wave generator extends through an opening in the housing.

Exemplary circular wave drive embodiments also employ an output element. The output element includes a circular-shaped wheel-driven portion having external peripheral teeth, and an output shaft portion that extends therefrom. The wheel-driven portion of the output element resides within the housing chamber and is located within the hollow central portion of the wheel opposite the wheel-driving portion of the wave generator. The diameter of the wheel-driven portion of the output element is smaller than the inner diameter of the wheel, such that the toothed peripheral surface of the wheel-driven portion is aligned with and is in partial contact with a toothed section of the wheel inner wall. The output shaft portion of the output element extends through an opening in the housing. The output shaft portion of the output element is coaxially located with the input shaft portion of the wave generator but extends from the housing in an opposite direction. Both the input shaft of the wave generator and the output shaft of the output element may pass through bearings.

In operation, the input shaft of the wave generator is connected to a rotation-imparting actuator, such as an electric drive motor. The actuator imparts rotational motion to the wave generator, which causes the wheel-driving portion thereof to rotate within the wheel. Rotation of the wave generator wheel-driving portion causes a rotation of the wheel along the inner wall of the housing, which wheel rotation causes a rotation of the output element at a like rotational speed.

Because the external peripheral surface of the wheel-driving portion of the wave generator and the mating surface of the inner wall of the wheel are substantially smooth, the coefficient of friction therebetween is low. Consequently, the wheel does not rotate in turn with the wave generator wheel-driving portion but, rather, slides to some degree along the peripheral surface of the wave generator wheel-driving portion. This results in a wheel rotational speed that is less than the rotational speed of the wave generator and associated actuator. The overall speed reduction between the input and output side of the circular wave drive depends on the amount of slippage that occurs between the wave generator and the wheel, and also on the difference between the number of teeth on the inner wall of the housing and the external periphery of the wheel. However, because a speed reduction is produced by two separate mechanisms, it can be understood that the magnitude of the speed reduction may be substantial.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 1A is a front cut-away view of an exemplary housing of one exemplary circular wave drive according to the invention;

FIG. 1B is a cross-sectional side view of the housing of FIG. 1A;

FIG. 2A is a front view of an exemplary wheel of one exemplary circular wave drive according to the invention;

FIG. 2B is a cross-sectional side view of the wheel of FIG. 2A;

FIG. 3A is a front view of an exemplary wave generator of one exemplary circular wave drive according to the invention;

FIG. 3B is a side view of the wave generator of FIG. 3A;

FIG. 3C is a top view of the wave generator of FIG. 3A;

DETAILED DESCRIPTION OF THE EXEMPLARY EMBODIMENTS

Figure 4B:
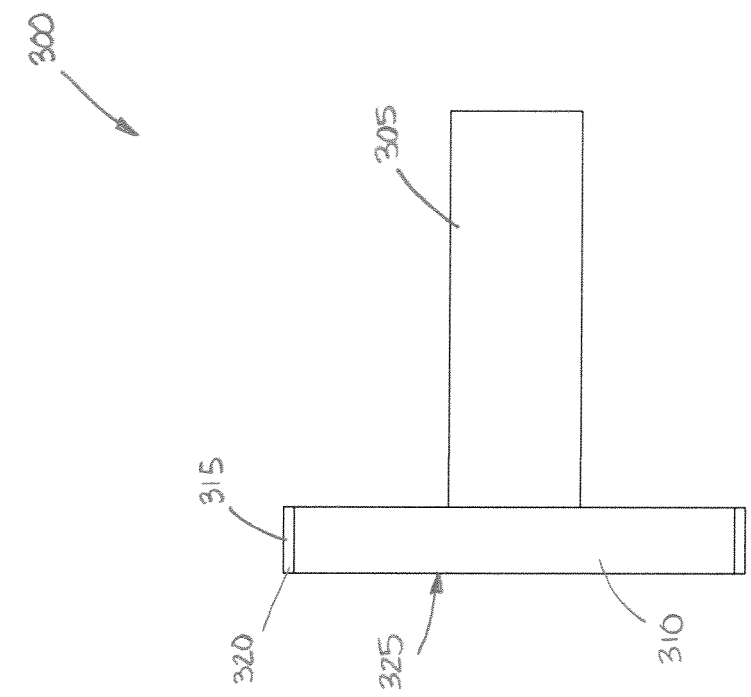
FIG. 4B is a side view of the wave generator of FIG. 4A.
Figure 4A:
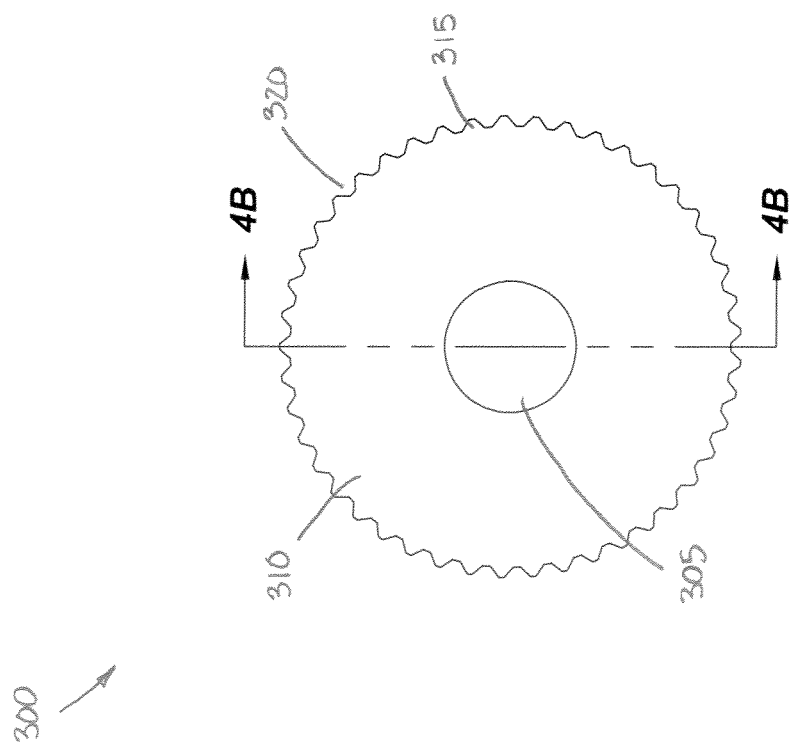
FIG. 4A is a rear view of an exemplary output element of one exemplary circular wave drive according to the invention.
Figure 5:
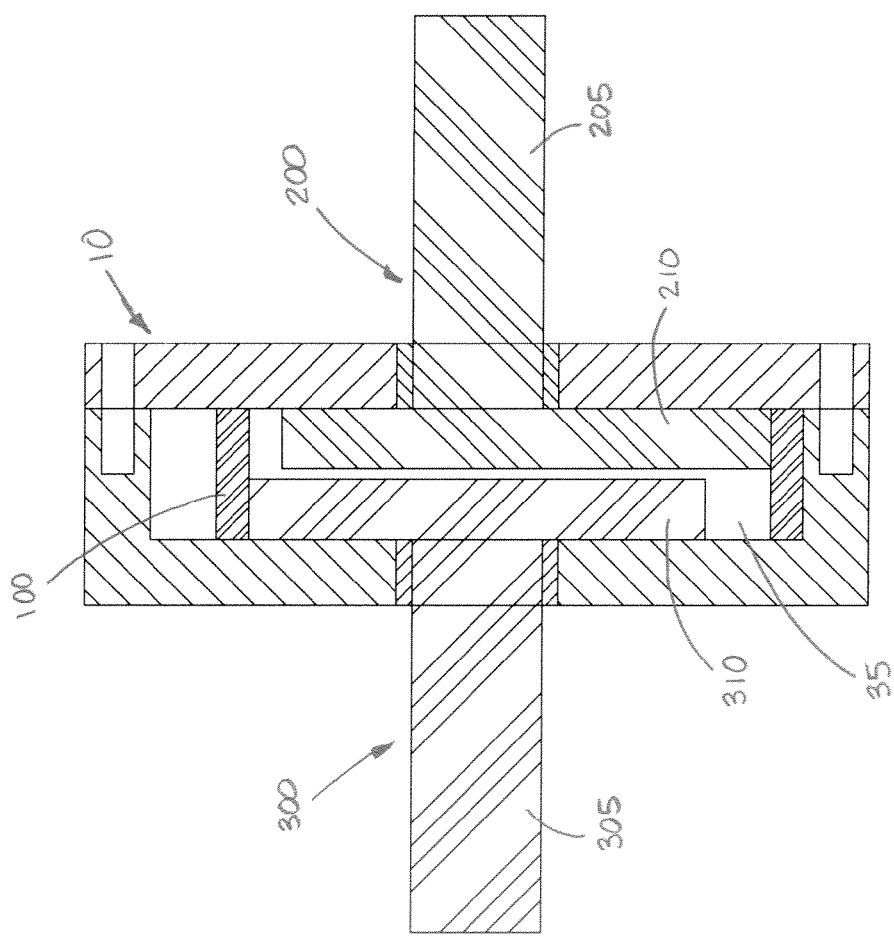
FIG. 5 is a cross-sectional assembly view of one exemplary circular wave drive according to the invention.

An assembled exemplary embodiment of a circular wave drive 5 is depicted in FIG. 5, with the various components thereof being illustrated in FIGS. 1A-4B. As shown in FIG. 5, the exemplary circular wave drive 5 includes at least a housing 10, a toothed wheel 100, a wave generator 200, and an output element 300.

One exemplary circular wave drive housing 10 that is usable in an exemplary circular wave drive such as the circular wave drive 5, is shown in FIGS. 1A-1B. This particular housing 10 is shown to be of disc shape and to be substantially hollow. Other external housing shapes are also possible as long as an internal peripheral wall 15 of circular shape is provided. This exemplary version of the housing 10 includes a main body portion 20 and a cover element 25 that closes a cavity 30 in the main body portion so as to form a circular chamber 35 within the housing. In this example, the cover element 25 is attached to the main body portion 20 of the housing 10 using threaded fasteners (not shown) that pass through and into aligned and cooperating holes 40, 45 in the cover element and main body portion, respectively. Other means of cover attachment are also possible, and would be within the knowledge of one of skill in the art.

Coaxially aligned openings 50, 55 are also located in the housing 10 for permitting the respective passage of portions of a wave generator and output element, which are described in more detail below. Bearings 60, 65 may be retained within each of the openings 50, 55 to facilitate rotation of the wave generator and output element. Alternatively, bearings may be affixed to respective opposite surfaces of the housing 10 for this purpose. Teeth 70 are disposed along the internal peripheral wall 15 in the chamber 35 for engaging a correspondingly-toothed wheel, which is also described in more detail below.

One exemplary wheel 100 that is usable in an exemplary circular wave drive such as the circular wave drive 5, is depicted in FIGS. 2A-2B. The wheel 100 is ring-shaped with a hollow central portion, and resides within the chamber 35 in the housing 10 when the drive 5 is properly assembled. The wheel 100 includes external teeth 105 that mesh with the teeth 70 located along the circular inner wall 15 in the chamber 35 of the housing 10. The outer diameter of the wheel 100 is smaller than the diameter of the circular inner wall 15, consequently, only a portion of the external teeth 105 of the wheel are meshed with the internal housing teeth 70 at any given time.

The wheel 100 also includes teeth 110 that are disposed along a portion of the inner diameter (wall) 115 thereof. More specifically, the inner wall 115 of the wheel 100 is circumferentially divided into a toothed portion 120 and a non-toothed portion 125. The non-toothed portion 125 of the of the wheel inner wall 115 is substantially smooth and adapted for contact with a substantially smooth surface of a wheel-driving portion 210 of the wave generator 200, which is described in detail below and depicted in FIGS. 3A-3C. The toothed portion 120 of the wheel inner wall 115 is adapted to mesh with external teeth 315 of the circular wave drive output element 300, which is described in detail below and shown in FIGS. 4A-4B.

One exemplary wave generator 200 that is usable in an exemplary circular wave drive such as the circular wave drive 5, is depicted in FIGS. 3A-3C. The wave generator 200 can be seen to include an input shaft portion 205 for connection to a rotation-imparting actuator such as an electric drive motor, and a wheel-driving portion 210 that is designed to contact and engage the non-toothed portion 125 of the inner wall 115 of the wheel 100 in a slipping manner when the circular wave drive 5 is properly assembled.

As can be best observed in FIG. 3A, the wheel-driving portion 210 of the wave generator 200 may have an oval or truncated circle (e.g., racetrack) cross-sectional shape. The center of the input shaft portion 205 is offset from the central axis $A_C$ of the wheel-driving portion 210 so as to impart an eccentric motion to the wheel-driving portion when the wave generator 200 is rotated. The peripheral face 215 of the wave generator wheel-driving portion 210 is non-toothed and substantially smooth.

The dimension of the wave generator wheel-driving portion 210 along its long axis $A_L$ is smaller than the inner diameter 115 of the wheel 100. When the circular wave drive 5 is properly assembled, the wheel-driving portion 210 of the wave generator 200 resides within the housing chamber 35 and is located within the hollow portion of the wheel 100 such that its peripheral face 215 is aligned with and is in constant partial contact with the non-toothed portion 125 of the wheel inner wall 115. The areas of contact between the peripheral face 215 of the wave generator wheel-driving portion 210 and the non-toothed portion 125 of the wheel inner wall 115 will change as the wave generator 200 rotates.

The input shaft portion 205 of the wave generator 200 extends through the opening 55 in the housing 10. More specifically, the input shaft portion 205 of the wave generator 200 extends through the bearing 65 that is retained in the opening 55 in the cover element 25. Preferably, the bearing 65 is press fit onto the input shaft portion 205 of the wave generator 200 or includes a set screw or other retention mechanism by which the input shaft portion of the wave generator may be securely retained in the bearing. This ensures that the bearing 65 rotates with the input shaft portion 205 of the wave generator 200 rather than the input shaft portion of the wave generator rotating within the bearing, and also prevents linear movement of the wave generator. In other embodiments, the position and orientation of the wave generator 200 may be reversed, such that the input shaft portion 205 thereof extends through the opening 50 and bearing 60 located in the main body portion 20 of the housing 10 rather than the opening 55 and bearing 65 located in the cover element 25 of the housing.

One exemplary output element 300 that is usable in an exemplary circular wave drive such as the circular wave drive 5, is depicted in FIGS. 4A-4B. The output element 300 can be seen to include an output shaft portion 305 for connection to a load, and a wheel-driven portion 310 that is designed to contact and engage the toothed portion 120 of the inner wall 115 of the wheel 100 when the circular wave drive 5 is properly assembled.

As can be best observed in FIG. 4A, the wheel-driven portion 310 of the output element 300 has a circular cross-sectional shape. The center of the output shaft portion 305 is coaxially aligned with the center of the wheel-driven portion 310 so as to impart a circular motion to the output shaft portion when the output element 300 is rotated. Teeth 315 extend from the external peripheral face 320 of the output element wheel-driven portion 310.

The diameter of the output element wheel-driven portion 310 is smaller than the inner diameter 115 of the wheel 100. When the circular wave drive 5 is properly assembled, the wheel-driven portion 310 of the output element 300 resides within the housing chamber 35 and is located within the hollow portion of the wheel 100 opposite the wheel-driving portion 210 of the wave generator 200 such that the teeth 315 on the peripheral face 315 are aligned with and are in constant, partial, meshed engagement with the teeth 110 of the toothed portion 120 of the wheel inner wall 115. The areas of meshed engagement between the external output element teeth 315 and the internal teeth 110 of the toothed portion 120 of the wheel inner wall 115 will change as the wheel 100 rotates.

The output shaft portion 305 of the output element 300 extends through the opening 50 in the housing 10. More specifically, the output shaft portion 305 of the output element 300 extends through the bearing 60 that is retained in the opening 50 in the main body portion 20 of the housing 10. Preferably, the bearing 60 is press fit onto the output shaft portion 305 of the output element 300 or includes a set screw or other retention mechanism by which the output shaft portion of the output element may be securely retained in the bearing. This ensures that the bearing 60 rotates with the output shaft portion 305 of the output element 300 rather than the output shaft portion of the output element rotating within the bearing, and also prevents linear movement of the output element. In other embodiments, the position and orientation of the output element 300 may be reversed, such that the output shaft portion 305 thereof extends through the opening 55 and bearing 65 located in the cover element 25 of the housing 10 rather than the opening 50 and bearing 60 located in the main body portion 20 of the housing. In other words, the orientation of the wheel 100, wave generator 200 and output element 300 may be reversed in other embodiments.

Referring now to FIG. 5, the assembled relationship of the housing 10, wheel 100, wave generator 200 and output element 300 may be better understood. The housing 10 is shown to be closed by the cover element 25 thereof so as to form the internal chamber 35 with the circular, toothed, inner wall 15. The wheel 100 resides in the chamber and a portion of its external teeth 105 are in meshed engagement with a portion of the teeth 70 on the internal wall 15 of the housing 10.

The wave generator 200 and the output element 300 are installed to the housing 10 as described above, such that the wheel-driving portion 210 of the wave generator and the wheel-driven portion 310 of the output element reside within the hollow portion of the wheel 100 and the input shaft portion 205 and output shaft portion 305 are oppositely directed. As shown, and as previously described, a portion of the substantially smooth peripheral face 215 of the wave generator wheel-driving portion 210 is in contact with a portion of the non-toothed portion 125 of the wheel inner wall 115, and a portion of the external teeth 315 on the output element wheel-driven portion 310 are in meshed engagement with a portion of the internal teeth 110 of the toothed portion 120 of the wheel inner wall.

The dimensions of the wave generator wheel-driving portion 210 and the output element wheel-driven portion 310 are such that a gap exists between the adjacent faces 220, 325 thereof when the wave generator 200 and the output element 300 are installed to the housing 10. This gap prevents rubbing between the wave generator 200 and the output element 300 during operation of the circular wave drive 5. The gap may be maintained by retention of the wave generator 200 and output element 300 by the respective bearings 65, 60. In an alternative embodiment, a bearing (not shown) may also be placed between the wheel 100 and the wave generator 200.

In operation of the assembled circular wave drive 5, the input shaft portion of the wave generator 200 is connected to an electric drive motor or another rotation-imparting actuator. The actuator imparts rotational motion to the wave generator 200, which causes the wheel-driving portion 210 thereof to rotate eccentrically within the wheel 100. Because the external peripheral surface 215 of the wave generator wheel driving portion 210 and the mating surface of non-toothed portion 120 of the inner wall 115 of the wheel 100 are both substantially smooth and the coefficient of friction therebetween is low, the wheel does not rotate directly with the wave generator wheel driving portion but, rather, slides to some degree along the peripheral surface thereof. This results in a rotational speed of the wheel 100 that is less than the rotational speed of the wave generator 200 and the associated actuator.

Figure 6:
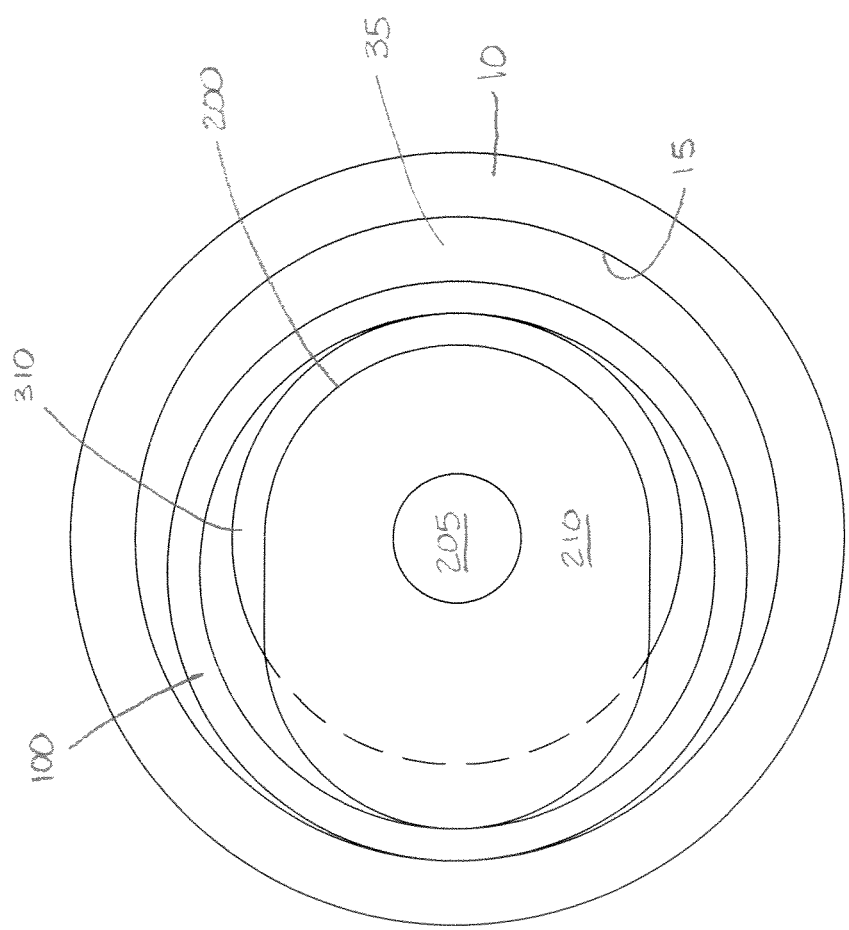
FIG. 6 is a schematic representation of the relationship and movement patterns of the various components of an exemplary circular wave drive according to the invention.

As can be understood from FIGS. 5-6, the motion of the wheel 100 with respect to the inner wall 15 of the housing 10 is also eccentric as a result of the eccentric motion of the wheel-driving portion 210 of the wave generator 200. More specifically, rotation of the wheel 100 by the wave generator 200 causes the wheel to travel along the inner wall 15 of the housing 10, with a changing portion of the external teeth 105 of the wheel being in meshed engagement with a changing portion of the internal teeth 70 of the housing during wheel movement.

Because a portion of the external teeth 315 on the output element 300 are also in meshed engagement with a portion of the internal teeth 110 disposed along the toothed portion 120 of the wheel inner wall 115, rotation of the wheel 100 by the wave generator 200 also causes a rotation of the output element. Changing portions of the external teeth 315 on the output element 300 become engaged and disengaged with changing portions of the internal teeth 110 of the wheel 100 during rotation. However, while rotation of the wheel 100 is eccentric in nature, rotation of the output element 300 is not.

The rotational speed of the output element 300 is the same as the rotational speed of the wheel 100. Also, because the output shaft portion 305 of the output element 300 and the input shaft portion 205 of the wave generator 200 are coaxially aligned, the input shaft and the output shaft have the same axis of rotation.

It can be understood from the drawing figures and the foregoing description of exemplary embodiments, that the overall speed reduction between the input and output side of the circular wave drive 5 depends both on the amount of sliding/slippage that occurs between the peripheral face 215 of the wave generator wheel-driving portion 210 and the non-toothed surface of the inner wall 115 of the wheel 100, and also on the difference between the number of teeth 70 on the inner wall 15 of the housing 10 and the number of teeth 105 on the external periphery of the wheel. Because the speed reduction is produced by two separate mechanisms, it can be understood that the amount of speed reduction achieved is highly adjustable and wide-ranging, and also that the magnitude of the speed reduction may be substantial.

While certain embodiments of the invention are described in detail above, the scope of the invention is not considered limited by such disclosure, and modifications are possible without departing from the spirit of the invention as evidenced by the following claims:

What is claimed is:

1. A circular wave drive, comprising:
   a housing having a chamber, the periphery of the chamber defined by a toothed circular wall; and
   a ring-shaped wheel residing in the chamber, the wheel including both external and internal teeth and being of a diameter that is smaller than the diameter of the toothed circular wall of the chamber, the wheel having a hollow central portion,
   wherein the wheel includes an internal wall circumferentially divided into a non-toothed portion and a toothed portion,
   wherein the toothed portion includes the internal teeth,
   wherein the non-toothed portion does not include the internal teeth, and
   wherein the toothed portion and the non-toothed portion are axially offset from one another.

2. The circular wave drive of claim 1, further comprising a wave generator having a wheel-driving portion that resides within the hollow central portion of the wheel and an eccentrically mounted input shaft extending from the wheel-driving portion and through the housing, a peripheral face of the wheel-driving portion being in contact with the non-toothed portion of the internal wall of the wheel, wherein the peripheral face of the wheel-driving portion of the wave generator and the non-toothed portion of the internal wall of the wheel are both substantially smooth.

3. The circular wave drive of claim 2, wherein the substantially smooth contacting surfaces of the wheel-driving portion of the wave generator and the internal wall of the wheel result in some degree of slipping of the wheel along the peripheral face of the wheel-driving portion of the wave generator during rotation of the wave generator.

4. The circular wave drive of claim 3, wherein the slipping of the wheel causes the wheel to rotate with a lesser rotational speed than that of the wave generator.

5. The circular wave drive of claim 2, further comprising a bearing interposed between the input shaft of the wave generator and an opening in the housing through which the input shaft passes.

6. The circular wave drive of claim 1, further comprising an output element having a wheel-driven portion that resides within the hollow central portion of the wheel opposite a wheel-driving portion of a wave generator, and an output shaft that extends from the wheel-driven portion and through the housing in the opposite direction of an input shaft of the wave generator, a toothed peripheral face of the wheel-driven portion being in meshed contact with the internal teeth of the wheel.

7. The circular wave drive of claim 1, further comprising a wave generator having an input shaft, and further comprising an output element having an output shaft, wherein the input shaft of the wave generator and the output shaft of the output element are coaxially aligned.

8. The circular wave drive of claim 1, wherein the number of teeth disposed along the circular wall of the chamber is greater than the number of external teeth on the wheel, so as to produce a further reduction in a rotational speed of the output element in comparison to a rotational speed of the wave generator.

9. A circular wave drive, comprising:
   a housing;
   a chamber within the housing, the periphery of the chamber defined by a toothed circular wall;
   a ring-shaped wheel residing in the chamber, the wheel having a diameter smaller than the diameter of the toothed circular wall of the chamber, the wheel having teeth along an external peripheral face of the wheel, the wheel having a hollow central portion;
   wherein the wheel includes an internal wall circumferentially divided into a non-toothed portion and a toothed portion,
   wherein the toothed portion includes the internal teeth,
   wherein the non-toothed portion does not include the internal teeth, and
   wherein the toothed portion and the non-toothed portion are axially offset from one another;
   a wave generator having a wheel-driving portion that resides within the housing chamber and within a hollow central portion of the wheel, the wheel-driving portion having a peripheral face and an input shaft extending from the wheel-driving portion, the peripheral face of the wheel-driving portion being in contact with the non-toothed portion of the circumferentially divided internal wall of the wheel; and
   an output element having a wheel-driven portion that resides within the housing chamber and within the hollow central portion of the wheel opposite the wheel-driving portion of the wave generator, the output element including a peripheral face and an output shaft that extends from the wheel-driven portion in the opposite direction of the input shaft of the wave generator, the peripheral face of the wheel-driven portion being in contact with the toothed portion of the circumferentially divided internal wall of the wheel;

wherein rotation of the wave generator will result in: a rotation of the wheel, and travel of the wheel along the circular wall of the housing, and wherein rotation of the wheel will cause a rotation of the output element.

10. The circular wave drive of claim 9, wherein the housing includes a main body portion and a cover element that is securable to the main body portion after installation of the wheel, wave generator, and output element within the housing.

11. The circular wave drive of claim 9, further comprising a bearing interposed between the input shaft of the wave generator and an opening in the housing through which the input shaft passes.

12. The circular wave drive of claim 9, further comprising a bearing interposed between an opening in the housing and the output shaft of the output element.

13. The circular wave drive of claim 9, wherein the input shaft of the wave generator and the output shaft of the output element are coaxially aligned.

14. The circular wave drive of claim 9, wherein the number of teeth disposed along the circular wall of the chamber is greater than the number of external teeth on the wheel, so as to produce a further reduction in a rotational speed of the output element in comparison to a rotational speed of the wave generator.

15. The circular wave drive of claim 9, wherein the peripheral face of the wheel-driving portion is substantially smooth, and wherein the input shaft extending from the wheel-driving portion is eccentrically mounted to the wheel-driving portion.

16. The circular wave drive of claim 9, wherein the peripheral face of the output element is toothed, and wherein the output shaft extending from the wheel-driven portion is centrally mounted to the wheel-driven portion.

17. A wheel for use in a circular wave drive, comprising:
a ring-shaped wheel including:
external teeth;
internal teeth; and
a hollow central portion;
wherein the wheel includes an internal wall circumferentially divided into a non-toothed portion and a toothed portion,
wherein the toothed portion includes the internal teeth,
wherein the non-toothed portion does not include the internal teeth, and
wherein the toothed portion and the non-toothed portion are axially offset from one another.

18. The wheel of claim 17, further comprising a wave generator having a wheel-driving portion that resides within the hollow central portion of the wheel, the wheel-driving portion having a substantially smooth peripheral face and an input shaft extending from the wheel-driving portion, the peripheral face of the wheel-driving portion being in contact with the non-toothed portion of the circumferentially divided internal wall of the wheel.

19. The wheel of claim 17, further comprising an output element having a wheel-driven portion that resides within the hollow central portion of the wheel, the output element including a toothed peripheral face and an output shaft that extends from the wheel-driven portion, the toothed peripheral face of the wheel-driven portion being in meshed-tooth contact with the toothed portion of the circumferentially divided internal wall of the wheel.

20. The wheel of claim 17, further comprising a substantially hollow and enclosed housing having a chamber, the periphery of the chamber defined by a toothed circular wall,
wherein the wheel has a diameter smaller than the diameter of the toothed circular wall of the chamber, and
wherein the external teeth of the wheel engage the teeth of the toothed circular wall.

* * * * *